United States Patent [19]

Kessler

[11] Patent Number: 5,278,691

[45] Date of Patent: Jan. 11, 1994

[54] SYMMETRICAL OVERFILLED POLYGON LASER SCANNER

[75] Inventor: David Kessler, Rochester, N.Y.

[73] Assignee: Eastman Kodak Company, Rochester, N.Y.

[21] Appl. No.: 903,386

[22] Filed: Jun. 24, 1992

[51] Int. Cl.⁵ ............................................. G02B 26/08
[52] U.S. Cl. .................................... 359/216; 359/495; 359/900
[58] Field of Search ............... 359/216–217, 17, 220, 221, 223, 487–490, 900, 625, 639, 494, 495, 496, 669; 358/206, 300, 302; 250/235–236; 346/108, 160

[56] References Cited

U.S. PATENT DOCUMENTS

| | | | |
|---|---|---|---|
| 3,922,485 | 11/1975 | Starkweather et al. | 178/7.6 |
| 3,944,323 | 3/1976 | Starkweather | 178/7.6 |
| 3,995,110 | 3/1976 | Starkweather | 178/7.6 |
| 4,034,408 | 7/1977 | Starkweather | 358/293 |
| 4,040,096 | 8/1977 | Starkweather | 358/302 |
| 4,054,361 | 10/1977 | Noguchi | 358/206 |
| 4,084,197 | 4/1978 | Starkweather | 358/300 |
| 4,230,902 | 10/1980 | Hug et al. | 178/15 |
| 4,274,703 | 6/1981 | Fisli | 359/205 |
| 4,284,994 | 8/1981 | Radl | 346/108 |
| 4,756,585 | 7/1988 | Kaneko et al. | 359/217 |
| 4,796,962 | 1/1989 | Dejager et al. | 359/217 |
| 4,919,501 | 4/1990 | Plaot | 359/217 |
| 4,941,721 | 7/1990 | Bantom et al. | 359/217 |
| 4,960,312 | 10/1990 | Razzaghi | 359/17 |
| 4,978,184 | 12/1990 | Straayer | 359/217 |
| 4,978,185 | 12/1990 | Appel | 359/217 |

FOREIGN PATENT DOCUMENTS 60-233616  11/1985  Japan ......................... G02B 26/10

Primary Examiner—Bruce Y. Arnold
Assistant Examiner—James Phan
Attorney, Agent, or Firm—Robert L. Randall

[57] ABSTRACT

A laser scanning device has an optical axis, a laser source for producing a beam of light, and a rotating polygon mirror having a plurality of facets. The beam of light is directed to the rotating polygon mirror so that the beam completely fills at least one of the mirror facets and overflows onto an adjacent mirror facet. The beam is reflected from the rotating polygon mirror so that the reflected beam is symmetrically positioned about the optical axis. The laser scanning device is operated in both overfilled and symmetrical modes.

10 Claims, 4 Drawing Sheets

SYMMETRICAL OVERFILLED POLYGON LASER SCANNER

TECHNICAL FIELD OF THE INVENTION

The present invention relates generally to laser scanners, and, more particularly, to a laser scanner having a polygon mirror.

BACKGROUND OF THE INVENTION

Most polygon mirror laser scanners commonly use an underfilled polygon, which means that the incoming beam to the polygon mirror is smaller than the individual mirror facets of the polygon. While the polygon is rotating, the beam position on the facet changes until the beam reaches the facet end. At that point, the laser is turned off and time is allowed for the beam to cross over to the next facet. Thus, the usable printing time (the duty cycle) is less than 100%, and is typically in the range of 60% to 70%. Most laser printers also are asymmetrical, meaning that the beam comes into the polygon at some large angle so that the beam shaping optics of the input beam do not interfere with the scanning optics.

Japanese Patent Application Laid Open Number 60-233616 discloses an underfilled symmetrical polygon printer. The printer uses a polarization method that is well known in other fields, such as optical disks, as a means for efficiently providing input beam and scanning beam separation. It discloses a symmetrical printer as a means for increasing the number of facets of the polygon, for the same polygon size and rotational speed, to thereby increase the effective writing speed in terms of lines per second. Employing a symmetrical configuration allows the use of a smaller polygon facet because the facet size is determined by the projected incoming beam.

Apparatus for this method is illustrated in prior art FIG. 1 where diverging light beams from laser 12 are collimated by lens 13 and further collected by cylindrical lens 14 to enter polarization beam splitter 10 as S polarized light. The incident optical beams are deflected 90° in the beam splitter 10 and directed to the polygon mirror 8. The linearly polarized beams from the beam splitter 10 are formed into circularly polarized light in quarter wave plate 9, and then entered to the deflection mirror surface of the polygon 8. The beams reflected at the deflection mirror surface of the mirror 8 are formed into P polarized light through the quarter wave plate 9 transmitted through the polarization beam splitter 10 and then entered into the image focusing optical system 11 to scan the drum 7. The system is symmetrical in that the beam 15a scanned by mirror 8 is symmetrical about an optical axis 15.

U.S. Pat. No. 4,796,962 discloses a method for forming a symmetrical underfilled scanner by displacement of the incoming beam in the page direction. A symmetrical underfilled laser printer is disclosed in U.S. Pat. No. 4,284,994 which is achieved by using a pelical splitter. This has the disadvantage of a large loss of up to about 75% of the light as compared with a polarization beam splitter which is theoretically lossless.

FIG. 2 illustrates prior art polygon sizes as a function of the duty cycle for different configurations. In the asymmetrical configurations an angle of 90 degrees is assumed between the input beam and output beam at the center of scan. The full-width-half-power (FWHP) of the beam, at the media, on axis is 33.2 microns. The polygon size for an 8 facet asymmetrical underfilled polygon with duty cycle of 0.7 is 84.2 mm, while the diameter of the symmetrical underfilled polygon for the same duty cycle is 59.5 mm. Alternately, the polygon can be kept at about the same size while changing to the symmetrical configurations with more facets, such as a 10 facet polygon with a diameter of 92.9 mm.

Most polygon mirror laser scanners commonly use an underfilled polygon because overfilled polygons have several disadvantages. One disadvantage of the overfilled polygon is that it uses only a portion of the incoming beam power and thus has to use a more powerful laser as compared with the underfilled polygon. Another disadvantage is that the scanning beam diameter of an overfilled polygon printer is determined by the cross section of the incoming large beam and the facet. This means that it is proportional to the cosine of the angle between the incoming beam and scanning beam. Because the beam size at the media, in the scan direction, is inversely proportional to the diameter of the beam of the polygon, it too is dependent on the cosine term. This is a severe problem in asymmetrical overfilled polygon systems. Another disadvantage of overfilled printers is the power fall off caused by the nonuniformity of the large input beam.

SUMMARY OF INVENTION

The present invention is directed to overcoming one or more of the problems set forth above. Briefly summarized, according to one aspect of the invention, a laser scanning device comprises a laser source for producing a beam of light, a rotating polygon mirror having a plurality of facets, and means for directing the beam of light to the polygon mirror so that the beam completely fills at least one of the mirror facets and overflows onto an adjacent mirror facet with the beam being reflected from the polygon mirror so that the reflected beam is symmetrically positioned about the optical axis.

According to another aspect of the invention, a method for operating a laser scanning device having an optical axis and having a polygon mirror with a plurality of facets comprises directing a beam of light towards the polygon mirror, completely filling at least one of the facets with the beam, overflowing the beam onto an adjacent facet, and reflecting the beam from the polygon mirror so that the reflected beam focused on the media creates a scan line which is symmetrically positioned about the optical axis.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE PREFERRED EMBODIMENTS

Figure 3:
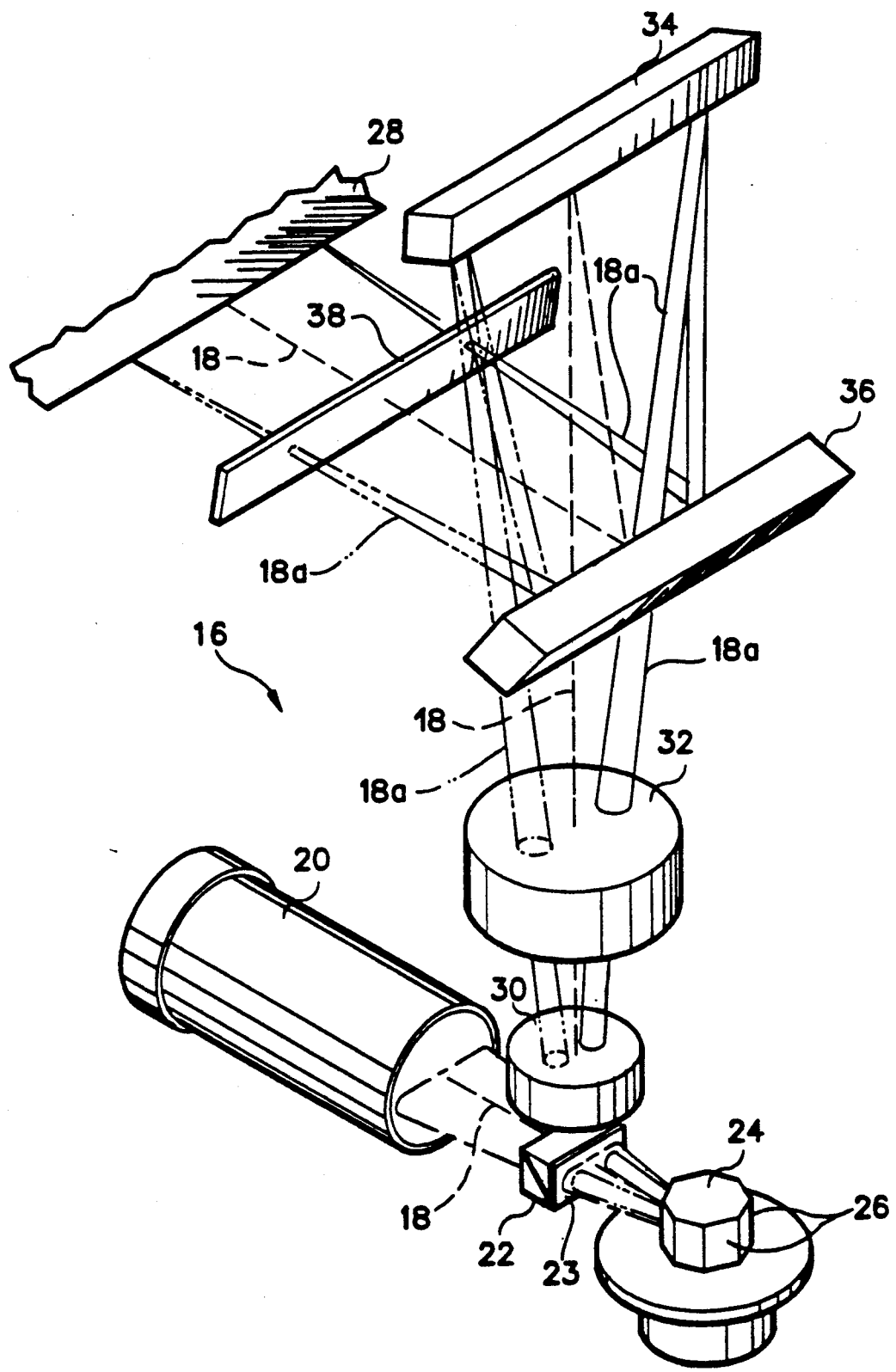
FIG. 3 is a diagrammatic perspective view of a preferred embodiment of a laser scanner having a polygon mirror in accordance with the present invention.

Referring to FIG. 3, a laser scanning device 16 has an optical axis 18. A laser and beam shaper 20 produces a beam of light that is large in the scan direction. The beam is directed to a polarizing beam splitter 22 and retarder 23. A portion of the beam is directed to a polygon mirror 24 that has a plurality of mirror facets 26. The input beam is wide enough to completely fill at least one facet 26, and preferably, completely fills three of the mirror facets 26. The beam is reflected from the polygon 24 so that the scanned reflected beam 18a is symmetrically positioned about the optical axis 18 thereby making the device both overfilled and symmetrical.

The reflected beam is redirected by the polarizing beam splitter 22 and retarder 23 to the image plane 28. The reflected beam is redirected to a first spherical scanning lens 30 and a second spherical scanning lens 32, and then travels to a cylinder mirror 34 where it is directed to a folding mirror 36 which directs it towards a window 38. The beam exiting the window 38 finds the image plane 28, which may be a photoconductive drum. The beam reflected off the folding mirror 36 may intercept the optical path of the beam directed from the spherical scanning lenses 30, 32 to the cylinder mirror 34.

One important aspect of the present invention is its use in a printer in an overfilled symmetrical configuration. By overfilled it is meant that a large beam is directed to the polygon mirror to cover more than one mirror facet, and preferably three facets, of the polygon. The polygon size needed for such an overfilled condition is much smaller than for an underfilled condition because the beam is always on the facets. No time is needed for the beam to crossover from one facet to the next. The scanning beam is basically a portion of the incoming beam as reflected by one facet.

Figure 1:
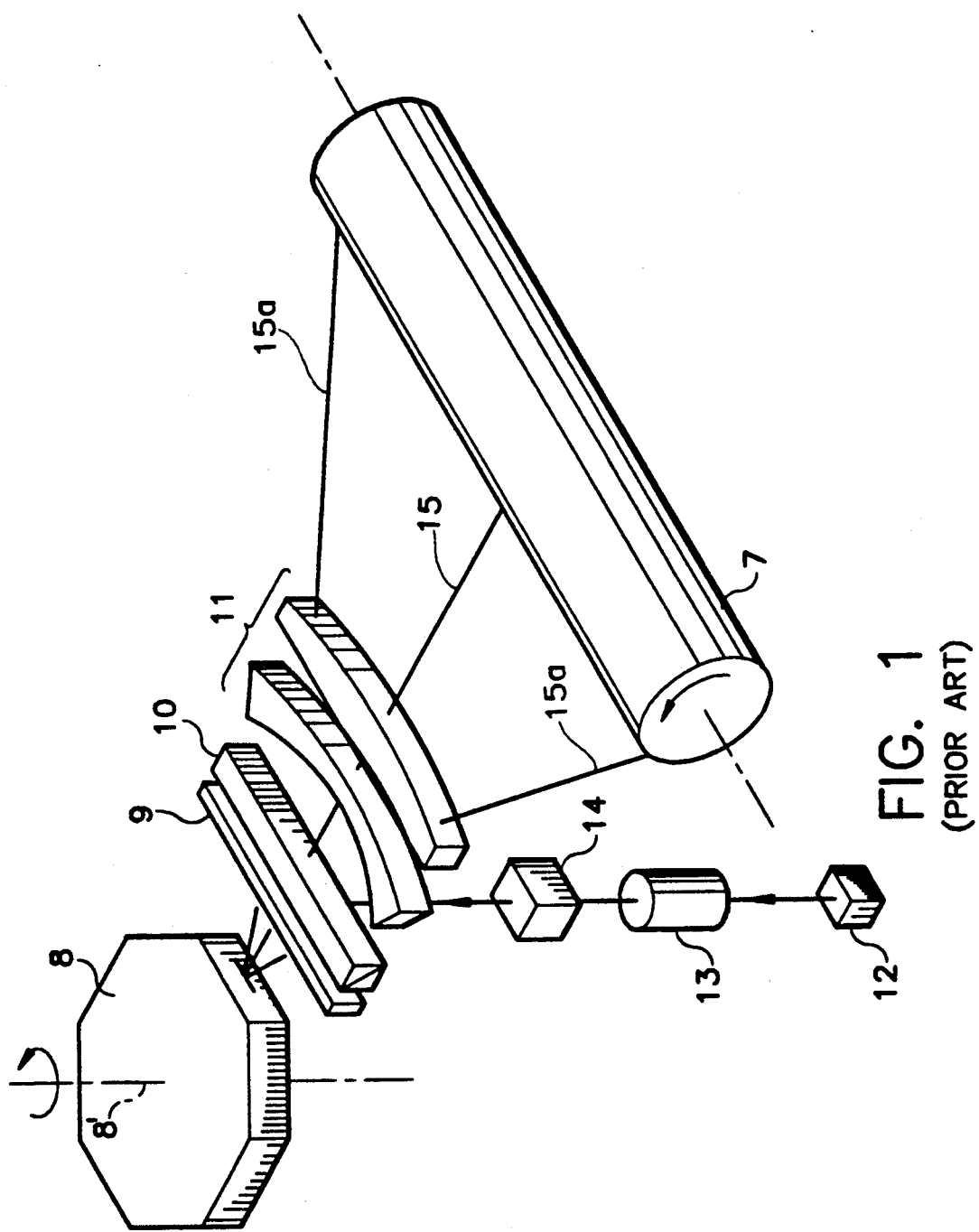
FIG. 1 is a diagrammatic perspective view of a prior art optical scanning device using a polygon mirror.
Figure 2:
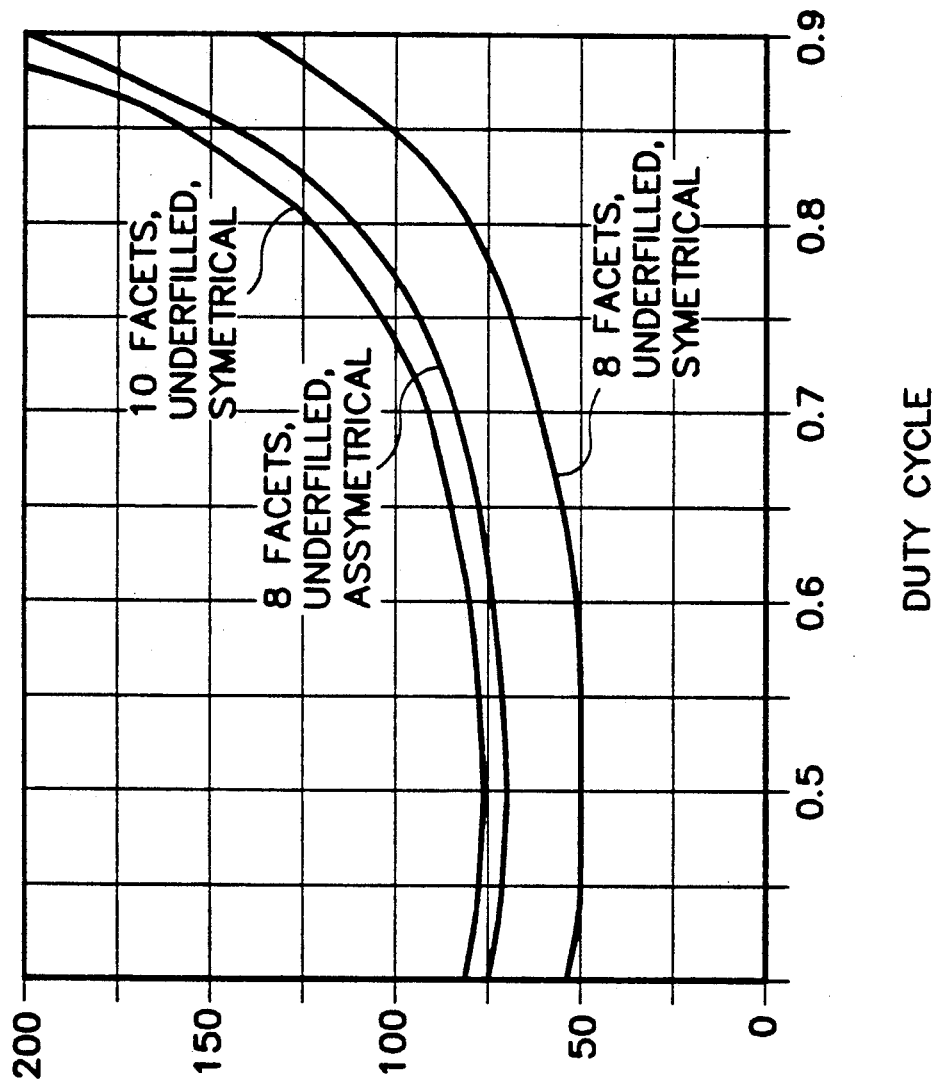
FIG. 2 is a graph comparing prior art polygon mirror size for overfilled and underfilled laser printer operation.
Figure 4:
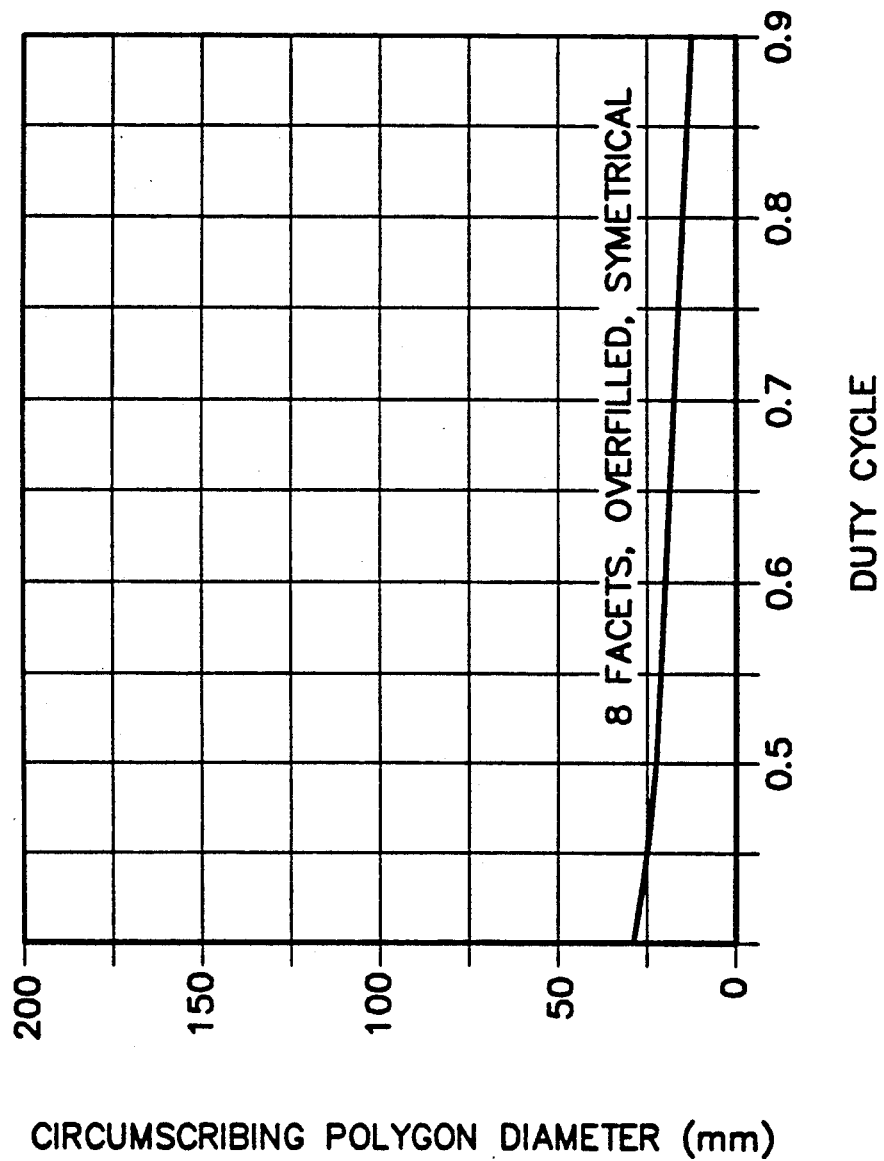
FIG. 4 is a graph similar to FIG. 2, but charting duty cycle and polygon diameter for the polygon mirror of FIG. 3.

For the conditions previously discussed with reference to FIG. 2, the diameter of the polygon for an overfilled, symmetrical, 8-facet polygon at 0.7 duty cycle, as shown in FIG. 4, is 16.2 mm and is compared with the underfilled symmetrical configuration with polygon diameter of 59.5 mm. The reduction in polygon size from the underfilled to the overfilled polygon is on the order of $$\frac{1}{1 - \text{duty cycle}}.$$

The polygon size reduction also reduces the facet displacement along the optical axis making the design of the scanning optics easier and providing for a larger depth of focus for polygon pyramid correction. Also, the scanning is symmetrical about the optical axis which also makes the scanning optics design easier and therefore potentially less expensive.

Normally, a disadvantage of an overfilled polygon is that only a portion of the incoming beam power is used requiring a more powerful laser compared with an underfilled polygon. This is not a severe problem with the present invention because diode lasers are powerful enough to make the loss acceptable for electrophotographic and photographic light sensitive media.

The scanning beam diameter of an overfilled polygon printer is determined by the cross section of the incoming large beam and the facet. This means that it is proportional to the cosine of the angle between the incoming beam and scanning beam. Because the beam size at the media, in the scan direction, is inversely proportional to the diameter of the beam of the polygon, it too will have dependency on the cosine term. This is a severe problem in asymmetrical overfilled polygon systems, however, for the overfilled symmetrical system of the present invention, the beam size change is not a major problem because of the small cosine term. For example, a 10 facet polygon at 0.6 duty cycle will have a cosine term of 0.982, thus a beam size change of only 1.8%, assuming the input beam is a uniform one.

Typically, power fall off is a disadvantage of overfilled printers, but the problem is much less severe in the symmetrical overfilled polygon of the present invention as compared with an asymmetrical one. In a 10 facet printer, with circumscribing diameter of 29.6 mm and duty cycle of 0.6, the power fall off for the symmetrical configuration is 8.2% for a Gaussian input beam with $$\frac{1}{e^2}$$

radius of 13.1 mm. This fall off can be further reduced by proper shaping of the input beam or by modulation of the laser to compensate for it.

While the invention has been described with particular reference to the preferred embodiments, it will be understood by those skilled in the art that various changes may be made and equivalents may be substituted for elements of the preferred embodiment without departing from invention. For example, an innovative feature of the present invention is changing the quarter wave plate suggested by Japanese patent application laid open number 60-233616. The use of different values of axis rotation and retardation for the retarder compensates for the power fall off with scan angle which is a problem in overfilled systems. In addition, many modifications may be made to adapt a particular situation and material to a teaching of the invention without departing from the essential teachings of the present invention.

It can now be appreciated that there has been disclosed an apparatus and method for operating a laser scanning device that has an optical axis and a polygon mirror with a plurality of facets. The apparatus includes a laser source for producing a beam of light and means for directing the beam of light to the polygon mirror so that the beam completely fills at least one of the facets and overflows onto an adjacent facet. The beam is reflected from the polygon mirror so that the reflected beam is symmetrically positioned about the optical axis.

The method includes directing a beam of light towards the polygon mirror, completely filling at least one of the facets with the beam, overflowing the beam onto an adjacent facet, and reflecting the beam from the polygon mirror so that the reflected beam is symmetrically positioned about the optical axis.

As is evident from the foregoing description, certain aspects of the invention are not limited to the particular details of the examples illustrated, and it is therefore contemplated that other modifications and applications will occur to those skilled the art. It is accordingly intended that the claims shall cover all such modifications and applications as do not depart from the true spirit and scope of the invention.

What is claimed is:

1. A laser scanning device having an optical axis, comprising:
   a laser source for producing a beam of light;
   a rotating polygon mirror having a plurality of facets; and
   means for directing said beam of light to said polygon mirror so that said beam completely fills at least one of said facets and overflows onto an adjacent facet, said laser source being arranged to direct said beam along said optical axis onto said polygon mirror so that said beam is reflected from said rotating polygon mirror and is scanned symmetrically with respect to said optical axis.

2. A laser scanning device, as set forth in claim 1, wherein said beam fills at least three facets.

3. A laser scanning device, as set forth in claim 1, including:
   a polarizing beam splitter; and
   a retarder positioned between the rotating polygon mirror and the polarizing beam splitter to increase intensity of the beam directed by the beam splitter toward a receiving medium.

4. A laser scanning device, as set forth in claim 3, wherein said retarder comprises a quarter wave plate.

5. A laser scanning device, as set forth in claim 1, wherein the beam reflected from the rotating polygon mirror is displaced by a small angle from a beam incident on the rotating polygon in a direction parallel to an axis of rotation of the polygon mirror.

6. A laser scanning device having an optical axis, comprising:
   a laser source for producing a beam of light;
   means for shaping said beam of light to produce a large beam in a scan direction;
   a polygon mirror having a plurality of facets; and
   means for directing said beam of light to said polygon mirror so that said beam fills three of said facets, said laser source being arranged to direct said beam along said optical axis onto said polygon mirror so that said beam is reflected from said polygon mirror and is scanned symmetrically with respect to said optical axis.

7. A laser scanning device, as set forth in claim 6, wherein said reflected beam is intercepted by a retarder to compensate for reduction in power of the beam caused by filling said three facets.

8. A laser scanning device, as set forth in claim 6, wherein the beam reflected from the rotating polygon mirror is displaced by a small angle from a beam incident on the rotating polygon in a direction parallel to an axis of rotation of the polygon mirror.

9. A method for operating a laser scanning device having an optical axis and having a polygon mirror with a plurality of facets, comprising:
   directing a beam of light along said optical axis towards said polygon mirror;
   completely filling at least one of said facets with said beam;
   overflowing said beam onto an adjacent facet; and
   reflecting said beam from said rotating polygon mirror and scanning the reflected beam symmetrically with respect to said optical axis.

10. A method, as set forth in claim 9, including displacing the beam reflected from the rotating polygon mirror by a small angle from a beam incident on the rotating polygon in a direction parallel to an axis of rotation of the polygon mirror.

* * * * *